Figures 2, 6:
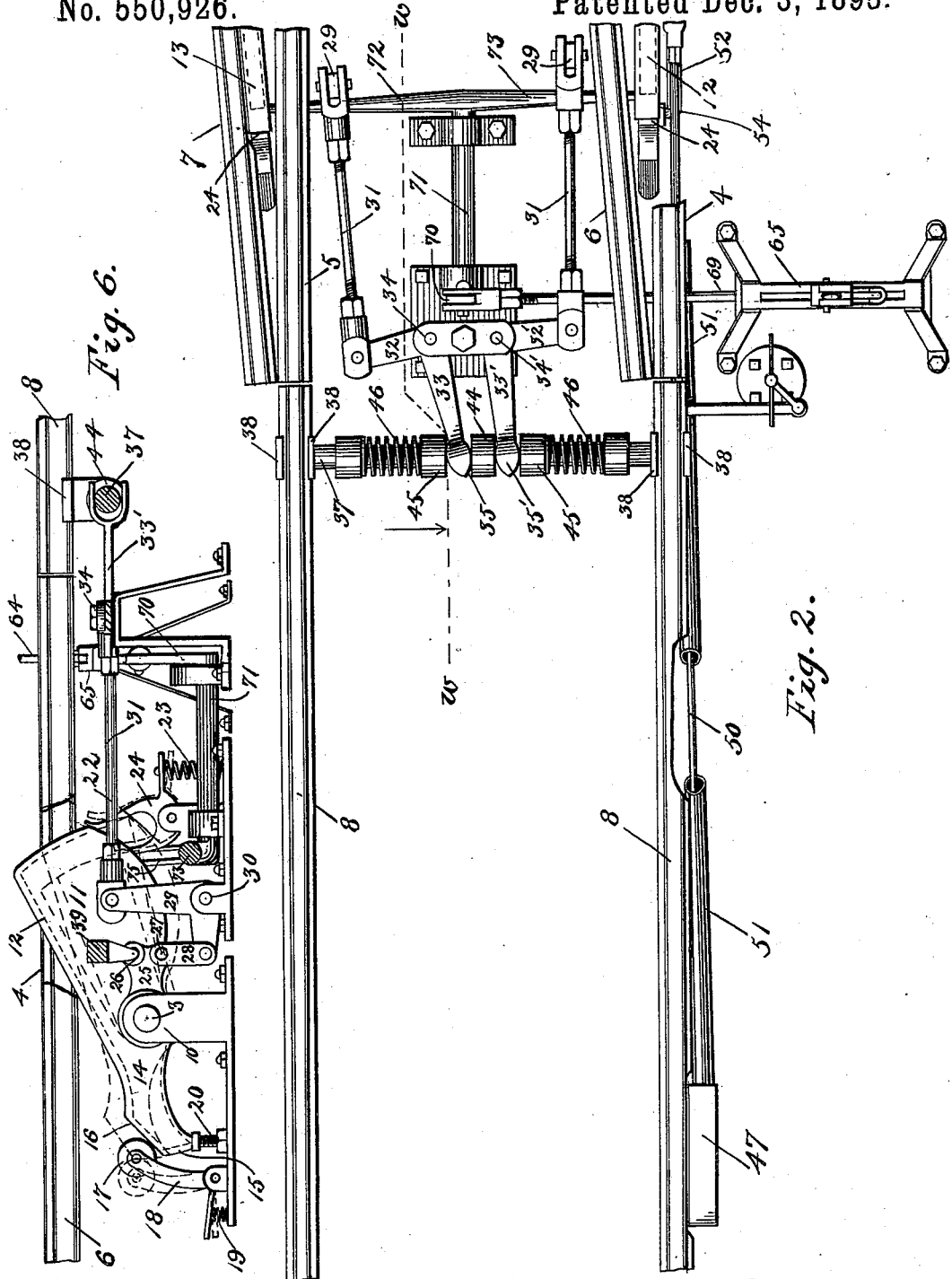

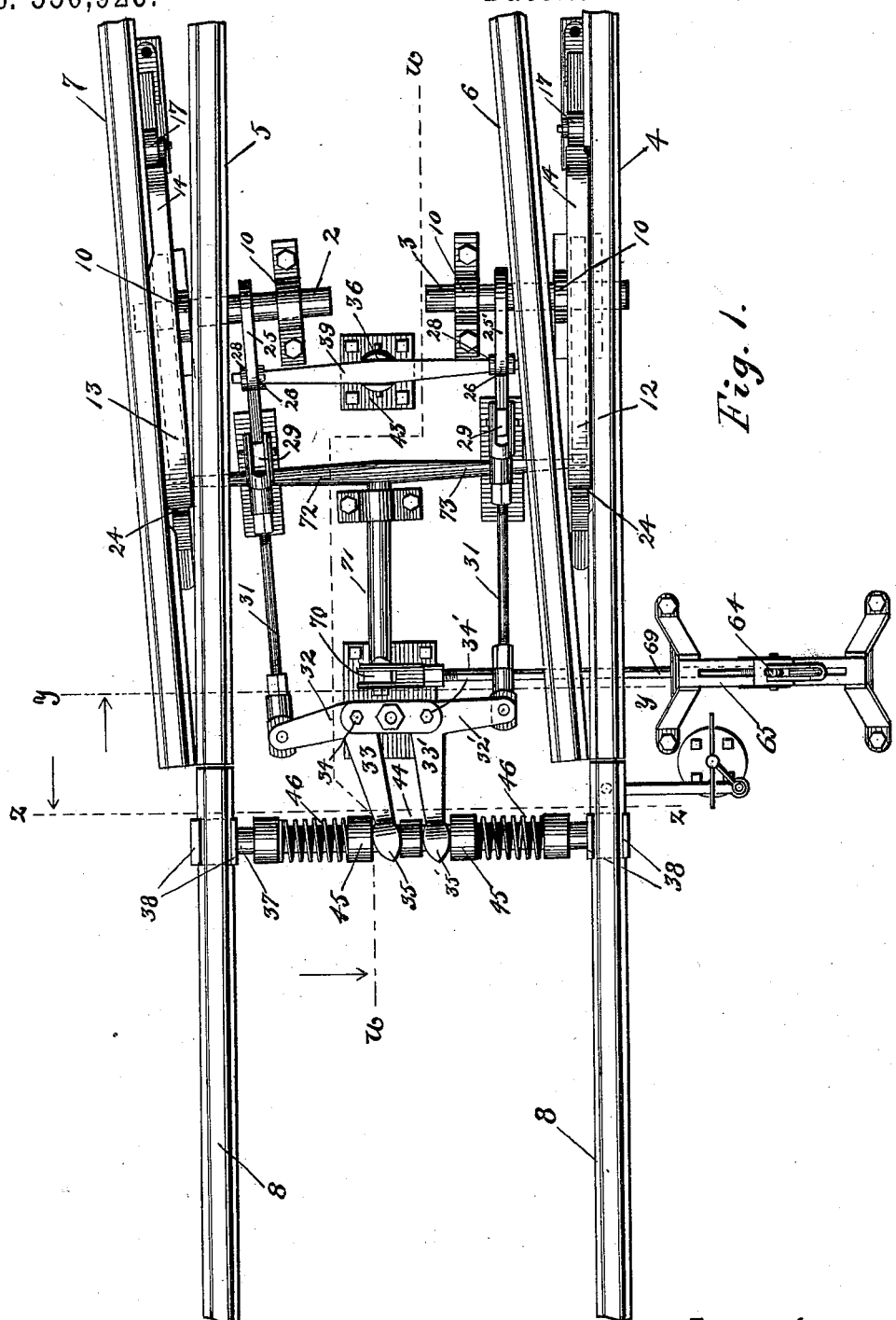

(No Model.) 4 Sheets—Sheet 2.

A. G. LAWRENCE.
AUTOMATIC RAILROAD SWITCH.

No. 550,926. Patented Dec. 3, 1895.

Witnesses,
Henry B Avery

Inventor,
Adelbert G. Lawrence.
By Paul A Hawley
his attorney.

(No Model.) 4 Sheets—Sheet 3.
A. G. LAWRENCE.
AUTOMATIC RAILROAD SWITCH.
No. 550,926. Patented Dec. 3, 1895.
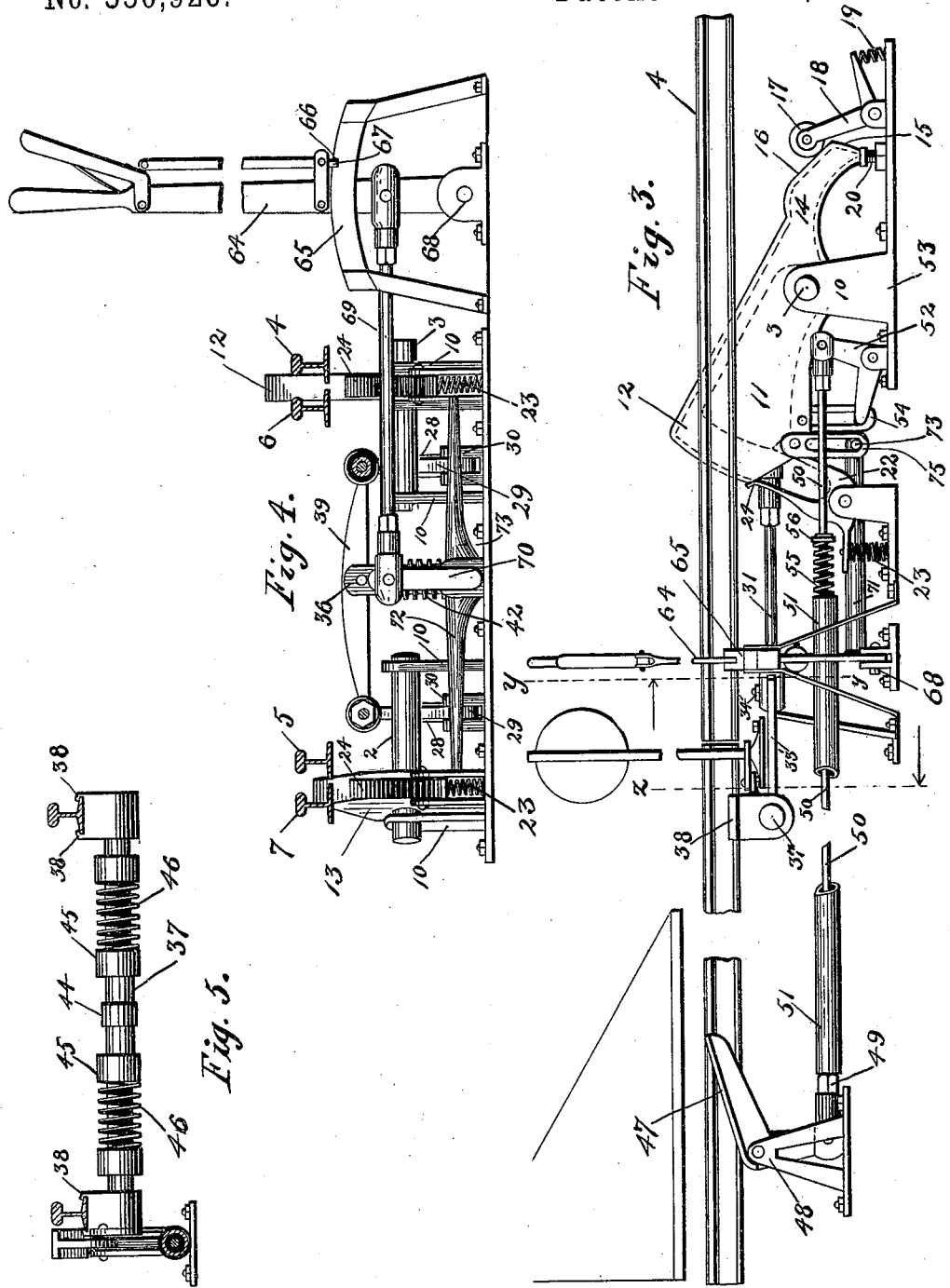
Witnesses,
Henry B. Avery,
F. S. Lyon
Inventor,
Adelbert G. Lawrence.
By Hawley
his attorneys.

(No Model.) 4 Sheets—Sheet 4.
A. G. LAWRENCE.
AUTOMATIC RAILROAD SWITCH.
No. 550,926. Patented Dec. 3, 1895.
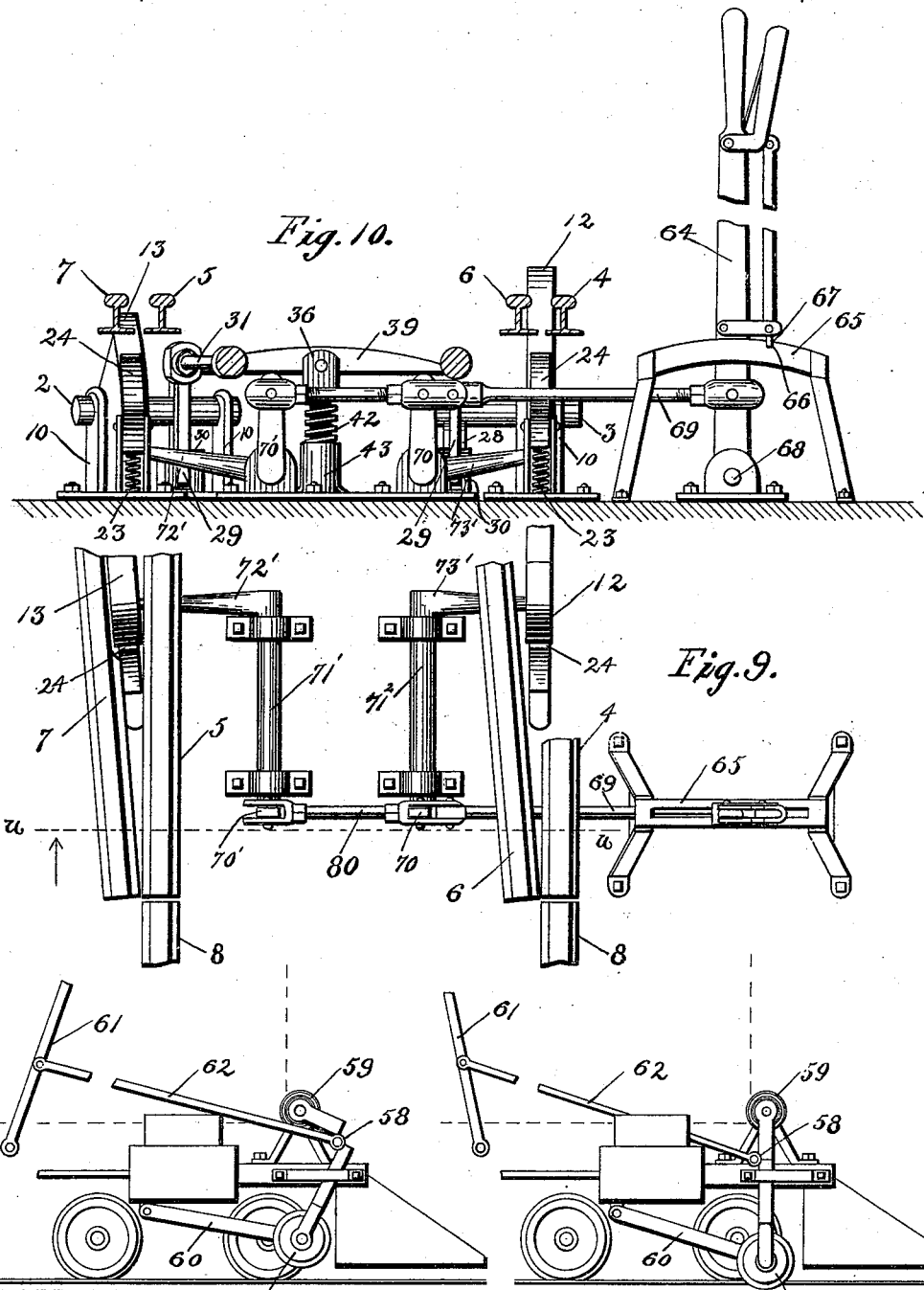
Witnesses:
Henry B. Avery.
F. S. Lyon
Inventor;
Adelbert G. Lawrence.
By Paul S. Hawley
his attorneys.

UNITED STATES PATENT OFFICE.

ADELBERT G. LAWRENCE, OF MOTLEY, MINNESOTA.

AUTOMATIC RAILROAD-SWITCH.

SPECIFICATION forming part of Letters Patent No. 550,926, dated December 3, 1895.

Application filed April 14, 1894. Renewed May 9, 1895. Serial No. 548,759. (No model.)

*To all whom it may concern:*

Be it known that I, ADELBERT G. LAW-RENCE, of Motley, county of Morrison, State of Minnesota, have invented certain new and useful Improvements in Automatic Railroad-Switches, of which the following is a specification.

My invention relates to automatically-operating railroad-switches, the work of throwing the switch being done by the locomotive or car passing over the same.

My invention further relates to means whereby an incoming train may be caused to throw the switch into line with the main track, and, further, to means whereby the switch may be readily operated by hand.

The object of my invention is to provide a railroad-switch of the automatic type which while being of a comparatively simple construction will be perfectly reliable in its operation, which will not easily get out of order, and the parts of which will be large and durable and easy of access, and, further, to provide means in connection therewith whereby the switch may be moved easily by means of an ordinary switch-lever.

A further and general object of my invention is to provide an automatic railroad-switch which shall be in every sense an improvement over that shown and described in Letters Patent of the United States No. 402,252, granted to me the 30th day of April, 1889.

My invention consists in general in an automatic railroad-switch of the construction and combination of parts hereinafter described, and particularly pointed out in the claims.

The invention will be more readily understood by reference to the accompanying drawings, forming a part of this specification, and in which—

Figure 1 is a plan view showing a switch embodying my invention. Fig. 2 is a somewhat similar plan view showing the means for operating the switch from an incoming train. Fig. 3 is a side elevation of the same switch with the operating parts in opposite positions. Fig. 4 is a transverse vertical section on the line *y y* of Fig. 3. Fig. 5 is a detail cross-section on the line *z z* of Fig. 3. Fig. 6 is a longitudinal vertical section on the line *w w* of Fig. 1. Figs. 7 and 8 are similar detail views showing the switch - operating mechanism provided on the locomotive. Fig. 9 is a partial plan-view of the switch, showing separate compound levers provided in connection with the operating-levers. Fig. 10 is a transverse vertical section thereof on the line *u u* of Fig. 9, and showing other parts not included in Fig. 9.

Generally speaking my railroad-switch is made up of three main combinations of parts, the first being wholly automatic within itself and adapted for use with outgoing trains—that is, trains passing off of the stationary points or rails onto the movable points or rails; second, an automatically - operative mechanism actuated from an incoming train and working in connection with the first combination of parts, and the third a mechanism for operating the switch and for depressing one or the other of the hereinafter-described shields and which forms a part of the first and second combinations.

The automatic switch-throwing mechanism to be operated by outgoing trains is best shown in Figs. 1, 3, 4, 9, and 10, wherein 2 and 3 represent short shafts arranged some distance back of the switch or rail points and at substantially right angles to the outside rails. 4 and 5 represent the rails of the main track, and 6 and 7 the rails of the siding, while 8 8 represent the movable switch points or rails. The short shafts 2 and 3 are held in bearing-blocks 10, of any suitable construction, and near the outer end of each short shaft and secured thereto is a shield-lever 11, arranged within a shield 12 13, of somewhat greater size. This shield is journaled upon the shaft and is provided with a rearwardly-extending end 14, the extreme end surface 15 of which conforms to the arc of a circle concentric with the shaft. The top of the end portion 14 is in the form of an inclined plane. A bell-crank 18 is pivoted on a suitable block arranged directly behind the shield, and its upright arm is pressed forward by a strong spring 19. The roller 17 is placed in the upper end of the bell-crank to press against the inclined plane to hold the part 14 down upon the adjustable stop 20, while when the shield is down the roller will press against the curved end 15, exerting neither an upward nor a downward pressure thereon, but simply holding the shield in place.

The two shields 12 and 13 are adapted to project upwardly between the rails 4 and 6, and the rails 5 and 7 being arranged close to the sides of the rails 4 and 7, respectively, in position to be engaged by the flanges of wheels rolling over said rails. Thus a train moving along the main rails 4 and 5 would depress the shield 12 and in the hereinafter-described manner raise the other shield, and in so doing cause the switch-points to move into line with the main rails 4 and 5. A train passing from the siding or side track would operate the switch through the shield 13 and its shield-lever. By the use of the shield a small latitude of movement is obtained before the shield-lever and the other parts of the switch device are operated, this movement being utilized to unlatch or unlock the raised shield-lever. In connection with each shield and shield-lever I employ the spring-latch 22, one arm of which is forced back beneath the lower corner of the shield-lever 11 when the shield and shield-lever are raised. The other arm, 24, has a curved upper end, which at such times rests beneath the end or lower corner of the shield. The latch thus formed has a U shape and the arm 22 is curved backwardly. As the shield is depressed, it acts as a cam on the arm 24 and throws the same out, thus withdrawing the latch-arm 22 from engagement with the shield-lever 11, the shield and shield-lever moving to their lower position without obstruction by the arm 22, owing to its curved form. As the wheel of the locomotive continues to depress the shield, the shield strikes against the shield-lever and both are moved down a maximum distance, the shaft 2 being rocked with the lever attached thereto. The shaft carries with it the arm 25, preferably provided with two holes or bearings 26 and 27, one above the other. From the lower one a link 28 extends to a connection with the lower arm of the bell-crank 29, which is pivoted on the block or bearing 30, and has an upright arm of preferably greater length than the lower. From the upright arm of the bell-crank the pitman-rod 31 extends forward to a connection with the arm 32 of the horizontally-arranged bell-crank 33, pivoted on the block 34 and having a forward arm provided with the yoke having curved sides 35 and engaging collars provided on the rod 37. This rod is connected by clamps 38 to the opposite rails 8 8. The connection of the other shield-lever and its shaft with the corresponding bell-crank 33' is the same except that the parts are in reversed positions. In order to transmit the motion of one shield-lever to the other and at the same time reverse their positions, I provide the walking bar or beam 39, pivoted in the head 36, and having its ends secured in the bearings or holes 26 of the two arms 25 and 25' upon the opposite short shafts. To prevent a sudden shock when one shield-lever is operated, I preferably ease the bearing of the walking-bar 39 by cushioning the head 36 thereof upon a spring 42, through which the spindle or shank passes down into the guide-sleeve or base 43. The connections between the arms 33 33' of the cross shaft or rod 37 are preferably yielding ones, a fixed collar 44 being provided in the middle and sliding collars 45 on opposite sides, the sliding collars being reinforced by springs 46.

The automatic connection to be operated from an incoming locomotive is best shown in Figs. 2 and 3, one of the devices being preferably provided on each side of the track. A pressure-foot 47 is pivoted in a suitable casting, 48 arranged at a considerable distance from the switch, and the foot projects upwardly at the outside of the rail in a position to be struck by a device on the locomotive. The pressure-foot is provided with a depending arm, to which is attached the end 49 of the operating-rod 50, which extends through the tube 51, and at its opposite end is attached to the bell-crank 52, pivoted on the main plate 53. The horizontal arm of this bell-crank is provided with a side projection or lug entering the link 54, the opening in which link is of somewhat greater length than the throw of the bell-crank arm. The bell-crank and all of the parts are normally held in the position shown in Fig. 3 by means of a spring 55, arranged between the end of the tube 51 and a collar 56, secured on the rod 50. When the pressure-foot 47 is forced down, the bell-crank is operated, and through the link the shield and the lever therein are drawn down, thus throwing the switch, as above described. For forcing down the pressure-foot or plate 47 I arrange a small wheel 57 upon the forward end of the locomotive at a point outside the rail on each side of the locomotive adapted to be dropped below the line of the rail in position to strike said foot. This wheel is held in the lower end of the toggle-joint 58, the upper end of which is pivoted on the locomotive-frame and is acted upon by a strong spring 59, tending to draw up the upper arm of the toggle-joint, and hence the wheel. A link 60 connects the wheel-yoke with the rear part of the locomotive-frame. For forcing down the pulley or wheel I provide means, such as the lever 61 and rod 62, for drawing back the joint of the toggle and straightening the rod, as shown plainly in Figs. 7 and 8.

The hand-operating mechanism is very simple in its construction, and the form thereof may be varied somewhat, as indicated in Figs. 1 and 4 and in Figs. 9 and 10. In the first figures 64 represents a switch-lever, and 65 a guide therefor provided with a notch 66, adapted to receive a suitable bolt 67. The lever is pivoted beneath on a block 68, and from the lever a pitman-rod 69 extends to a pivotal connection with the upper end 70 of the compound lever. This compound lever consists of the arm 70, the shaft portion 71, and the oppositely-extended arms 72 and 73. The shaft portion is firmly journaled in suitable blocks or bearings, as shown, and the ends of the arms 72 and 73 extend outward and enter the openings in the links 75, depending from the opposite shields and having openings which are of somewhat greater length than the throw of said arms, so that when the shields are in either extreme position the ends of the arms will not actually engage with the ends of the links, thereby allowing perfect freedom of movement for the shields and the parts attached thereto without the slightest interference with said arms, which interference might under some conditions result in breaking a portion of the mechanism. In place of employing the single shaft 71, with its two arms, I may use separate shafts $71'$ and $71^2$, as shown in Figs. 9 and 10, connecting the upper ends of their arms 70 by a pivotal link or rod 80 and the remainder of the mechanism remaining the same, the operation of the arms $72'$ and $73'$ being exactly similar to that of the arms shown in Fig. 1.

The operation of my device is as follows: Normally one shield is raised when the other is lowered, its raising being practically determined by the use of the connecting walking beam or bar 39. Suppose the last train to have passed onto the switch from the main track and to have depressed the shield 12, its lever, and other parts to throw the switch-points into the position shown in Fig. 1. Then suppose a second train to be upon the side-track rails 6 and 7 and moving toward the open switch. Arriving at this point the flange of the outside wheel of the locomotive or of a car (whichever happened to be in advance) would strike the shield 13 and throw the same down, thereby depressing the shield-lever within, rotating the shaft 2, moving down the arm 25 and therewith drawing forward the upper end of the bell-crank 29, and thence, through the connecting-rod and bell-crank 32, throwing the switch-points 8 8 into line with the rails 6 and 7. The shield next to a particular rail will always be down when the switch-point is in line with said rail, and as the other shield is outside of the line of travel of the locomotive or car trucks it will not be struck thereby. To throw the switch by hand it is necessary to throw the switch-lever in the direction in which it is desired the switch-points should be moved, and then move the switch-lever back to the notch in order that the compound levers may resume their normal position—namely, positions out of actual engagement with any part of the switch apparatus save their being confined within the links 75. As the slots in these links are of greater length than the throw of the compound lever or levers, these levers in no wise interfere with the automatic action thereof. The throwing of a switch by an incoming train through the pressure-foot 47 is exactly similar in operation to the throwing thereof by hand, the bell-crank 52 performing the same function as one of the arms of the compound lever. In all cases the first part of the movement of the shield acts to unlock the shield-lever, after which the movement is all taken up in operating said lever and therewith the switch-points. In the drawings it has been necessary to show some parts of the automatic mechanism much closer together than in practice—as, for instance, the pressure-foot 47 would be located at a considerable distance from the switch and in all cases back of the pivot-points of the switch-rails 8 8. The pressure of the small roller of the bell-crank 18 upon the end of a shield when the same is depressed is just sufficient to hold the same in place, while after the roller has passed onto the inclined surface it will hold the shield up with a force sufficient to prevent the shield from being depressed by any ordinary weight, such as the weight of a person who might step thereon.

In the drawings I have shown my invention applied to a stub-switch; but the parts may be used equally well with point-switches, the only difference being the reversal of the switch-operating parts to correspond with the changed direction in the throw of the switch.

Having thus described my invention, I claim as new and desire to secure by Letters Patent—

1. The combination, with the main and side tracks, of the switch points or rails, the shields located between the pairs of the rails of the main and side tracks, the shafts whereon they are journaled, the shield levers within the same, means in connection with said shields for unlocking said levers during the first part of the movement of the shields, the switch moving mechanism connected with said shafts, the rear extensions upon said shields, the inclined end surfaces thereof, and spring parts adapted to act thereon and to hold the shields in position, substantially as described.

2. The combination, with the main and side tracks, of the switch points or rails, the shields located between the opposite pairs of the main and side-track rails, the shafts whereon they are journaled, the shield levers within the same, means in connection with said shields for unlocking said levers during the first part of the movement of the shields, the switch moving mechanism connected with said shafts, the rear extension upon said shields, the inclined end surfaces, the curved ends, the spring arms for each, the roller carried therein and adapted to engage the inclined part or the curved end as the shield is raised or lowered, respectively, and stops for limiting the movement of the shields substantially as described.

3. The combination, with the rails of the main and side-tracks, of the switch rails to be thrown into line therewith, the transverse shafts arranged beneath the main and side-track rails, the shields pivoted thereon and adapted to project up between said rails, the shield levers arranged beneath the shields and fixed to said shaft, the latches for locking said shield levers and arranged to be operated to unlock the same by the first part of the movement of each of their respective shields, the arms 25 upon said shafts, the pivoted walking beam connected with said arms 25, the links depending from said arms, the bell cranks whereto said links are attached, the connecting rods extending from the upright arms of said bell cranks and attached to the second horizontally arranged bell cranks connected with said switch-points, whereby as either shield and its shield lever are depressed the switch-points are correspondingly moved, and the means consisting in the hand-operated compound lever for operating said shields and shield levers and thereby the switch, at will, substantially as described.

4. The combination, with the main and side-track rails, of the movable switch-points or rails, short shafts arranged beneath opposite pairs of side and main rails, the shields journaled upon said shafts, the shield levers arranged within said shields and secured upon said shafts, respectively, the shield operated latch for locking said shield levers, pressure devices for retaining the shields in either position, the switch operating parts connected with said short shafts, the link depending from each shield, and compound lever arms projecting into said links, respectively, and means for throwing said arms whereby the switch may be operated by hand, substantially as described.

5. The combination, with the main and side track rails, of the movable switch points or rails, short shafts arranged beneath opposite pairs of said main rails, the shields journaled upon said shafts, the shield levers arranged within said shields and secured upon said shafts, respectively, the shield operated latch for locking said shield levers, pressure devices for retaining the shields in either position, the switch operating parts connected with said short shafts, a link depending from each shield, the compound lever arms projecting into said links, respectively, means for throwing said arms whereby the switch may be operated by hand, and the openings within said links being of greater length than the throw of their compound lever arms with which the links engage substantially as described and for the purpose specified.

6. The combination, with the main and side-track rails, of the movable switch points or rails, short shafts arranged beneath opposite pairs of said main rails, the shield levers secured upon said shafts, respectively, the switch operating parts connected with said short shafts, a slotted link connected with each shield lever, the pressure foot 47 located at a distance from the switch, an arm thereon, a rod extending from said arm, a bell crank pivotally connected with the opposite end of said rod, and engaging said link, whereby, as the pressure foot is depressed said shield lever is drawn down and the switch operated, substantially as described.

7. The combination, with the main and side track rails, of the movable switch points or rails, short shafts arranged beneath opposite pairs of said main and siding rails, the shields journaled upon said shafts, the shield levers arranged within said shields and secured upon said shafts, respectively, the shield operated latch for locking said shield levers, pressure devices for retaining the shields in either position, the switch operating parts connected with said short shafts, a slotted link depending from each shield, the pressure foot 47 located at a distance from the switch, an arm thereon, a rod extending from said arm, a bell crank pivotally connected with the opposite end of said rod, and a finger or lug upon said bell crank engaging said link, whereby, as the pressure foot is depressed said shield lever is drawn down and the switch operated, substantially as described.

8. The combination, with the main and side-track rails, and the switch-points or rails, of the pivoted levers arranged in proximity to the main and side-track rails, respectively, means connecting said levers whereby as one is raised the other is lowered, means also in connection with said levers for operating the switch points or rails as said levers are operated, a link depending from each lever, a compound lever for each lever and having an arm extending into engagement with the link thereof, the opening in said link being of greater length than the throw of said arm, a switch stand and its lever, and a pitman extending therefrom and whereby said compound levers are operated, as and for the purpose specified.

In testimony whereof I have hereunto set my hand this 29th day of March, A. D. 1894.

ADELBERT G. LAWRENCE.

In presence of—
C. G. HAWLEY,
F. S. LYON.